Patented Apr. 28, 1936

2,038,565

UNITED STATES PATENT OFFICE 2,038,565

PROCESS OF PRODUCING LAMINATED GLASS

August W. Hornig, Chicago, Ill.

No Drawing. Application March 16, 1929, Serial No. 347,727

11 Claims. (Cl. 49—81)

The type of laminated glass with which my invention is concerned, is that in which sheets of celluloid are interposed between sheets of glass. It should be understood that in using the term "celluloid" I include all equivalent preparations or materials.

The object of my invention is to effect a superior adhesion between the glass and the celluloid; to prevent deterioration of the celluloid, interposed between the glass plates, around the edges; and to minimize changes in the color and clarity of the celluloid. In describing my process, I shall confine myself to the methods used in laminating two glass plates and a single sheet of celluloid interposed between them. It will readily be understood that this process has to be slightly varied where a greater number of glass plates and celluloid sheets are to be laminated together.

I attain my object by employing, in the process of producing laminated glass, a number of new means, methods or devices, hereinafter described.

(a) I clean the glass plates, to be used in my process; thereupon treat them with a solution of tinchloride; and then permit them to dry.

(b) I distill a suitable mineral amyl alcohol, commonly produced from gasoline, such as pentasol, normal butyl carbinol, or isobutyl carbinol, then permit the distillate to cool; and thereupon thoroughly wash the glass plates to be laminated, on the sides thereof that are to adjoin the celluloid, and also the celluloid sheet, on both sides thereof, with the distillate thus prepared.

*Pentasol is a fairly uniform mixture of pure amyl alcohol, of substantially the following structural formula—*

| Structural formula | Boiling point | Percent in pentasol |
|---|---|---|
| 1. $CH_3.CH_2.CHOH.CH_2.CH_3$ | 116° C. | 8% |
| 2. $CH_3.CHOH.CH_2.CH_2.CH_3$ | 119° C. | 18% |
| 3. $CH_2OH.CH(CH_3).CH_2.CH_3$ | 128° C. | 32% |
| 4. $(CH_3)_2.CH.CH_2.CH_2OH$ | 131° C. | 16% |
| 5. $CH_2OH.CH_2.CH_2.CH_2.CH_3$ | 136° C. | 26% |

(c) I dip a suitable padded tray, such as I have described in my application for United States patent, Ser. No. 345,520, filed March 8, 1929, into a suitable liquid, preferably cold water for a sufficient length of time to cause the pad of such tray to become thoroughly soaked with the liquid. Withdrawing, thereupon, said tray from the liquid, I place upon it the glass plates to be laminated, preferably prepared in the manner described under (a) above, with a celluloid sheet, preferably prepared after the manner described under (b) above, interposed between them. I then cover the tray and the glass plates therein with a covering pad, such as I have also described in the aforesaid application for United States Letters Patent, having first thoroughly soaked said covering pad with a liquid, preferably water or oil. The tray, with the materials and covering pad thus placed thereon, I thereupon deposit upon the lower platen of a suitable press, both platens of which are heated to a sustained temperature of from 200 to 500 degrees Fahrenheit. I thereupon effect compression of the materials prepared as herein above indicated, and placed between the platens of the press, developing a maximum pressure ranging from 30 pounds per square inch upward. While much heavier pressures have been found necessary by others, I have discovered that with my process and means, the application of a maximum pressure of 30 pounds per square inch is sufficient to yield good results, though I believe the application of heavier pressures to be commonly advisable where the glass plates to be compressed are thick. The measure and duration of the heat, to be applied in connection with the compression process, must vary according to the thickness of the layers to be compressed. Experiments have demonstrated that the most perfect results are usually obtained when the temperature of the celluloid to be laminated is raised, preferably from both sides evenly, to a point just slightly below that at which the celluloid will begin to bubble.

(d) After the process of compression is completed, preferably according to the specifications set forth under (c) above, I permit the laminated glass to cool gradually; then expose it suddenly to a heat sufficient to again raise the temperature of the celluloid therein to a point just below that at which the celluloid will begin to bubble; and then again permit the laminated glass to cool gradually. This I prefer to do in a suitable oven of any construction desired.

Concerning the employment of distillate from mineral amyl alcohol, in place of vegetable amyl alcohol, I am unable to explain theoretically the difference in their effects. But I do know that whenever fusel oil, or amyl alcohol made from fusel oil, or a distillate made therefrom, is employed, there is a strong tendency toward coloration of the celluloid so that the celluloid soon begins to assume a yellowish or greyish tint, and loses more or less of its clarity. This effect is entirely absent, or is at least very greatly minimized, when a distillate from mineral amyl alcohol is used, as hereinabove described by me.

As to the secondary heating of the laminated glass plates, after the process of compression has been completed, I am likewise unable to give a theoretical explanation of its advantages. All I know about it, is that where such heating is omitted, the lamination is much more liable to develop defects upon exposure to air and light, especially along the edges of the laminated glass. In my opinion it is due chiefly, though not entirely, to my use of the secondary heating described under (d) above, that there is no necessity for sealing the edges of laminated glass produced according to my process, and that even when laminated glass produced under my process is cut, no deterioration will take place, as a rule, along the fresh edges of the cut material.

As to the placing of the wet pads below and above the glass plates to be laminated, I also am not certain as to the exact reasons why I obtain superior results by means of it. But I believe that the cold wet pads, used by me below and above the glass to be laminated, favorably affect the process of lamination in three ways—(a) by acting as retarders and equalizers generally, in reference to both heat and pressure applied, thereby materially reducing breakage; (b) by retarding heating of the glass plates and adhesion of the celluloid to the glass plates until the full measure of the compression pressure of the press has been applied, thereby making it possible to expel all removable fluid from between the celluloid and the glass plates, instead of preventing full expulsion of such fluid by premature lamination; (c) by causing steam to be generated within the pads, and a greater evenness of pressure upon the glass plates thereby to be realized.

It is evident that my process may be modified by substitution of equivalents and in other ways without departure from the essentials of my invention. All such modifications I intend to cover by my claims.

I claim—

1. A process of producing laminated glass, comprising the application of tin chloride solution to the glass plates to be laminated.

2. A process of producing laminated glass, comprising the application of tin chloride solution to the glass plates to be laminated, in combination with the application of a distillate from mineral amyl alcohol to a celluloid sheet about to be interposed between the glass plates.

3. A process of producing laminated glass, comprising the application of tin chloride solution to the glass plates to be laminated, in combination with the application of a distillate from pentasol to a celluloid sheet about to be interposed between the glass plates.

4. A process of producing laminated glass, comprising the application of tin chloride solution to the glass plates to be laminated, in combination with the application of a distillate from mineral amyl alcohol to a celluloid sheet about to be interposed between the glass plates, and the placing of the materials to be laminated between wet pads, preparatory to the application of pressure and heat.

5. A process of producing laminated glass, comprising the application of tin chloride solution to the glass plates to be laminated, in combination with the application of a distillate from mineral amyl alcohol to a celluloid sheet about to be interposed between the glass plates, and the placing of the materials to be laminated between cold wet pads, preparatory to the application of pressure and heat.

6. A process of producing laminated glass, comprising the application of tin chloride solution to the glass plates to be laminated, in combination with the application of a distillate from pentasol to a celluloid sheet about to be interposed between the glass plates, and the placing of the materials to be laminated between wet pads, preparatory to the application of pressure and heat.

7. A process of producing laminated glass, comprising the application of tin chloride solution to the glass plates to be laminated, in combination with the application of a distillate from pentasol to a celluloid sheet about to be interposed between the glass plates, and the placing of the materials to be laminated between cold wet pads, preparatory to the application of pressure and heat.

8. A process of producing laminated glass, comprising the application of tin chloride solution to the glass plates to be laminated, in combination with the application of a distillate from mineral amyl alcohol to a celluloid sheet about to be interposed between the glass plates; compression of the materials to be laminated under heat; and exposure of the laminated materials to a secondary heating without pressure, substantially as described.

9. A process of producing laminated glass, comprising the application of tin chloride solution to the glass plates to be laminated, in combination with the application of a distillate from pentasol to a celluloid sheet about to be interposed between the glass plates; compression of the materials to be laminated under heat; and exposure of the laminated materials to a secondary heating without pressure, substantially as described.

10. A process of producing laminated glass comprising the placing of the materials to be laminated between wet pads and applying pressure and heat to the materials while being held between said wet pads.

11. A process of producing laminated glass comprising the placing of the materials to be laminated between cold wet pads and applying pressure and heat to the materials while being held between said wet pads.

AUGUST W. HORNIG.